United States Patent [19]
Golino et al.

[11] Patent Number: 5,589,536
[45] Date of Patent: Dec. 31, 1996

[54] GLASS FIBER BINDING COMPOSITIONS, PROCESS OF BINDING GLASS FIBERS, AND GLASS FIBER COMPOSITIONS

[75] Inventors: Carlo M. Golino, Evergreen; Thomas J. Taylor; William H. Kielmeyer, both of Englewood; Leo K. Thiessen, Littleton, all of Colo.; Carl A. Rude, Lafayette, Ind.

[73] Assignees: QO Chemicals, Inc.; Schuller International, Inc.

[21] Appl. No.: 402,576

[22] Filed: Mar. 13, 1995

Related U.S. Application Data

[63] Continuation of Ser. No. 886,668, May 19, 1992, abandoned.

[51] Int. Cl.$^6$ ...................................... C08L 61/00
[52] U.S. Cl. .................... 524/593; 524/584; 524/595; 524/596; 524/597; 524/598; 524/494
[58] Field of Search .................. 524/593, 594, 524/595, 596, 597, 598, 492, 493, 494

[56] References Cited

U.S. PATENT DOCUMENTS

| | | |
|---|---|---|
| 2,521,532 | 9/1950 | Mitman et al. . |
| 2,723,209 | 11/1955 | Philipps . |
| 3,491,041 | 1/1970 | Dornte . |
| 3,594,345 | 7/1971 | Brown et al. ............................ 523/217 |
| 3,681,286 | 8/1972 | Brown et al. . |
| 3,793,286 | 2/1974 | Peterson et al. . |
| 3,813,371 | 5/1974 | Bozer et al. . |
| 3,816,375 | 6/1974 | Bozer et al. . |
| 3,850,727 | 11/1974 | Bozer et al. . |
| 3,888,816 | 6/1975 | Brown et al. . |
| 3,914,192 | 10/1975 | Flaut et al. ............................. 260/4 R |
| 3,925,286 | 12/1975 | Fahey . |
| 3,927,139 | 12/1975 | Bozer et al. . |
| 4,017,461 | 4/1977 | Dunlop et al. . |
| 4,021,401 | 5/1977 | Jeppsen . |
| 4,053,447 | 10/1977 | Shea . |
| 4,076,873 | 2/1978 | Shea . |
| 4,134,442 | 1/1979 | Laitar . |
| 4,137,387 | 1/1979 | Misertis et al. . |
| 4,154,797 | 5/1979 | Misertis et al. . |
| 4,178,273 | 12/1979 | Brown . |
| 4,212,909 | 7/1980 | Brown . |
| 4,283,462 | 8/1981 | Meyer et al. . |
| 4,291,088 | 9/1981 | Wolff . |
| 4,309,512 | 1/1982 | Mikogami et al. . |
| 4,361,613 | 11/1982 | Bogner et al. . |
| 4,426,460 | 1/1984 | Pentz . |
| 4,430,459 | 2/1984 | Akerberg et al. . |
| 4,439,348 | 3/1984 | Akerberg . |
| 4,463,043 | 7/1984 | Reeves et al. . |
| 4,548,752 | 10/1985 | Pentz . |
| 4,640,934 | 2/1987 | Michel . |
| 4,735,974 | 4/1988 | Mandorf . |
| 4,761,441 | 8/1988 | Woodson ............................... 523/439 |
| 4,832,723 | 5/1989 | Shisler et al. . |

FOREIGN PATENT DOCUMENTS 1200336  2/1986  Canada .

OTHER PUBLICATIONS

F. H. Newth et al., 2,5–Bishydroxymethylfuran, Research Supplement 3–I, Research Correspondence, 1950, pp. 50–51.

R. T. Conley et al., An Investigation of the Structure of Furfuryl Alcohol . . . Spectroscopy, J. of Applied Polymer Science, vol. 7, 1963, pp. 37–52.

Furan Polymers, Reprint from Encyclopedia of Polymer Science and Technology, vol. 7, 1967, pp. 432–445.

E. M. Wewerka et al., A Study of the Low Molecular Weight Components of Furfuryl Alcohol Polymers, J. of Applied Polymer Science, vol. 13, 1971, pp. 1437–1451.

C. R. Schmitt, Polyfurfuryl Alcohol Resins, Polymer–Plast. Technol. Eng., 3(2), 1974, pp. 121–158.

R. H. Leitheiser et al., Water Dilutable Resin Binder For Particleboard, presented at "Wood Adhesives . . . Needs", Symposium, Madison, Wis., Sep. 23–25, 1980, pp. 59–64.

Furan Derivates, vol. 11, 1980, pp. 499–527.

Z. Laszlo–Hevdig et al., Some Kinetic Features of the Initial Stage of the Acid–Catalyzed . . . 1, Die Angewandte Makromolekulare Chemie, 107, 1982, pp. 61–73.

J. P. Pfau et al., Heat–Initiated Furan Resin For Rapid Runway Repair, ESL–TR–82–37, AFESC, Tyndall Air Force Base, FL, Aug. 1983, pp. 1–24.

Z. Laszlo–Hedvig et al., Some Kinetic Features of the Initial Stage of Acid–Catalyzed . . . II*, Die Angewandte Makromolekulare Chemie, 122, 1984, pp. 51–59.

QO Chemicals, Inc., Material Safety Data Sheet, for QUA-CORR™ 1300 Resins, Apr. 12, 1989, one page.

QO Chemicals, Inc., Material Safety Data Sheet, for Furfuryl Alcohol, Jun. 23, 1989, two pages.

A. Gandini, Polymers and Oligomers Containing Furan Rings, Agricultural and Synthetic Polymers, 1990, pp. 195–208, Developed from TX Symposium Apr. 9–14, 1989.

QO Chemicals, Inc., Versatile Chemicals from Nature brochure, 1990, six pages.

The Quaker Oats Company—Chemicals Division, Material Safety Data Sheet, for Fa–RezB–260, two pages.

*Primary Examiner*—Edward J. Cain
*Attorney, Agent, or Firm*—Cornelius P. Quinn

[57] ABSTRACT

The present invention relates to a glass fiber binding composition comprising an effective binding amount of an aqueous soluble furan resin, 15 to 99 percent by weight water, and an effective amount of a catalyst for curing the furan resin. The invention further pertains to a process of binding glass fibers at junctions of the fibers comprising the steps of providing newly formed glass fibers, applying an effect binding amount of an aqueous soluble furan resin to the junctions of the glass fibers, and curing the resin at the junctions of the glass fibers. Finally, the invention also discloses a glass fiber composition comprising a plurality of glass fibers having a plurality of junctions where two or more fibers meet, and an effective binding amount of an aqueous soluble furan resin comprising 15 to 99% water applied to the junctions of the glass fibers.

36 Claims, 1 Drawing Sheet

GLASS FIBER BINDING COMPOSITIONS, PROCESS OF BINDING GLASS FIBERS, AND GLASS FIBER COMPOSITIONS

CROSS-REFERENCE TO RELATED APPLICATION

This application is a continuation of U.S. Ser. No. 886,668, filed May 19, 1992, abandoned and entitled "Glass Fiber Binding Compositions, Process Of Binding Glass Fibers, And Glass Fiber Compositions".

FIELD OF THE INVENTION

This application relates to aqueous compatible furan binder compositions for glass fibers, a process for binding glass fibers, and also to glass fiber compositions utilizing the binders.

BACKGROUND OF THE INVENTION

Fiber glass comes in many shapes and sizes and can be used for a variety of applications. A general discussion of fiber glass technology is provided in "Fiber Glass" by J. Gilbert Mohr and William P. Rowe, Van Nostran Reinhold Co., New York 1978 which is herein incorporated by reference.

As discussed in "Fiber Glass", glass fibers are generally mass produced in two types: bulk or blown fiber for insulation and allied applications, and continuous-filament, or reinforcing fibers. In either form raw fiber glass is abrasive and easily fragmentized. Damage to the individual glass fibers can occur as a result of the self-abrasive motion of one fiber passing over or interacting with another fiber. The resulting surface defects cause reductions in overall mechanical strength.

Consequently, binders have been developed to prevent these problems. A typical binder may prevent the destructive effects of self-abrasion without inhibiting the overall flexibility of the finished glass fiber product. Extremely good resistance and resilience to conditions of elevated humidity and heat are beneficial in view of the wide variety of end use applications for glass fiber/binder compositions.

One of the most important performance properties is a consequence of the practical realities of the glass fiber manufacturing business. Cured glass fiber/binder compositions are normally very bulky and voluminous. Batts and rolls used as insulation in buildings have densities ranging from 0.5 to 1.0 pound per cubic foot (pcf) and generally require binder contents of 3 to 7% by weight. Since it is prohibitively expensive to ship such materials in an uncompressed state, the batts and rolls are bundled and compressed in packages to 8 to 25% of their manufactured thickness. During the shipping process these packages are normally subjected to conditions of elevated temperature and humidity. Once the compressed batt or roll reaches the consumer and is removed from its packaging, it should recover between 40% to 100% of its original volume. Insulation materials not achieving such recovery values normally have difficulty meeting advertised thermal resistivity (R) values. In general, the better the recovery value of the glass fiber/binder composition, the better insulating properties the composition will possess.

Fiber glass products denser than 0.7 pcf generally have load bearing requirements, either in the form of compressive or flexural strength, as well as thermal and sound attenuation restrictions.

The amount of binder present in a fiber glass product is dependent on several factors including the product shape, the type of service required, compressive strength requirements and anticipated environmental variables such as temperature. Binder content is determined by the loss on ignition test, described below, and is given as % L.O.I. In general, binder contents may range from 1 to 25% L.O.I., depending on the specific end use application. Applications include sound control batts with low binder content; industrial-grade thermal insulation for driers, ovens, boilers, furnaces, and other heat generators; low-to-intermediate L.O.I. duct liners and fiber glass flexible ducts and high-L.O.I. rigid ducts; and pipe insulation with intermediate to high binder levels. Molded fiber glass parts (e.g., automotive topliners) are generally thin pieces of high density (15–22 pounds per cubic foot at ⅛ to ⅜ inches thick, for example) and require binders to provide excellent flexural strength. Fiber glass products used for filtration have wide ranges of fiber diameter and binder levels.

Traditionally, high compressibility ratios, recovery values and other desirable properties have been obtainable only with phenol formaldehyde resins. As a result, for many years glass fiber binders have been almost exclusively based upon phenol formaldehyde resins. These systems typically include aminoplast resins such as melamine and urea, silicone compounds, soluble or emulsified oils, wetting agents, and extenders or stabilizers.

Although widespread, the use of phenol formaldehyde resins in binders for fiber glass involves numerous problems and disadvantages.

Chief among these is the difficulty in complying with ever stricter environmental regulations. Typically these phenolic binders contain large amounts of low molecular weight species including phenol, formaldehyde and volatile 1:1 and 1:2 phenol formaldehyde adducts such as 2-methylolphenol and 4-methylolphenol. During the curing process, these volatile low molecular weight components are released into the atmosphere in substantial volumes as volatile organic compounds (VOC). Since the process of manufacturing fiber glass typically involves spraying large volumes of phenol formaldehyde binders into high volume air streams, and then curing the product in convection ovens that involve high volumes of air, fiber glass manufacturers have an urgent need to reduce their VOC emissions, particularly with regard to formaldehyde.

Attempts at reducing the free formaldehyde content of typical phenol formaldehyde binders have been unsuccessful because excess formaldehyde is essential to curing and bonding in such systems. Techniques such as scrubbing and incineration would require substantial financial expenditures with the potential for uncertain results.

Attempts to convert free formaldehyde into less obnoxious and dangerous chemicals have involved the addition of ammonia or urea. Such additions were intended to convert free formaldehyde into hexamethylenetetramine or a mixture of mono and dimethylol ureas. Unfortunately however, urea, hexamethylenetetramine, and mono and dimethylol ureas can all contribute to the production of trimethylamine, which gives the cured phenolic binder and finished product an undesirable "fishy" odor. In addition, nitrogen containing compounds can decompose to yield ammonia and other potentially harmful volatile compounds.

Phenol formaldehyde resins also require careful handling procedures. Since the cooked resin must be refrigerated until use, refrigerated trucks and holding tanks are required. Even with refrigeration, the storage life of a phenolic resin is typically 15 days.

Adding to these problems is the fact that phenol formaldehyde resins have a short life span. Finished binders based on such resins must used within 2 to 12 hours of their initial formulation.

Finally, because phenol formaldehyde resins are petroleum based, they are particularly vulnerable to fluctuations in price and availability.

As a result, an alternative to phenol formaldehyde based fiber glass binders has long been sought.

The present invention solves the problems caused by the use of phenol formaldehyde resins in binders for fiber glass by providing binders based on aqueous compatible furan resins. The furan binders of the instant invention provide many of the advantages of phenolic binders while resulting in substantially reduced VOC emissions. What is particularly desirable about the furan binders disclosed herein is the use of water as a significant component.

The furan binders of the present invention have several advantages. Formaldehyde is not a significant curing or decomposition product and the furan resins form very rigid thermosets. Since furan resins are derived from vegetable cellulose, a renewable resource, they are inexpensive and readily available.

It is, therefore, an object of the present invention to provide a binder for fiber glass which will provide substantially all of the advantages of phenol formaldehyde binders while simultaneously resulting in significantly reduced emissions of volatile organic compounds, particularly formaldehyde.

Another object of the present invention is to provide methods of applying the novel furan binder to raw or bare glass fibers so as to provide the required performance characteristics.

Finally, another object of the invention is to provide glass fiber compositions employing the novel binders which are suitable for incorporation into a variety of end use applications.

SUMMARY OF THE INVENTION

The present invention relates to a glass fiber binding composition comprising an effective binding amount of an aqueous soluble furan resin and 15 to 99 percent by weight water. The invention further pertains to a process of binding glass fibers at junctions of the fibers, comprising the steps of providing newly formed glass fibers, applying an effective binding amount of an aqueous compatible furan resin to the junctions of the glass fibers, and curing the resin at the junctions of the glass fibers. Finally, the invention also discloses a glass fiber composition comprising a plurality of glass fibers having a plurality of junctions where two or more fibers meet, and an effective binding amount of an aqueous compatible furan resin applied to the junctions of the glass fibers.

DETAILED DESCRIPTION OF THE PREFERRED EMBODIMENT

Figure 1:
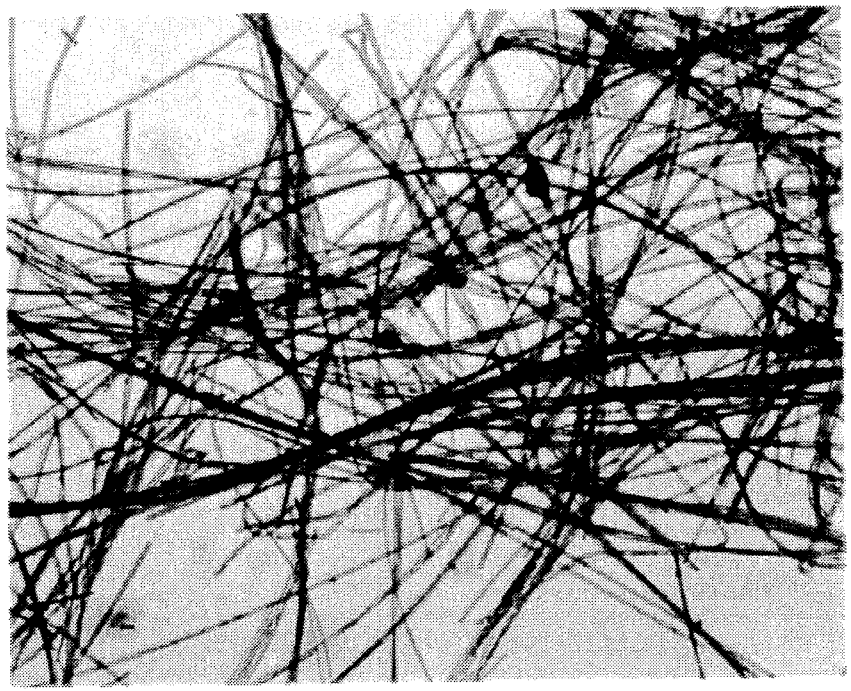
FIG. 1 illustrates a desired distribution of a 66% N.V. bis(hydroxmethyl)furan resin based binder applied to glass fibers at a magnification of 79×.

The present invention broadly provides glass fiber binding compositions comprised of aqueous compatible furan resins which provide finished products with properties similar to that achieved with traditional phenol formaldehyde binders. Compatible as used herein is defined as any aqueous mixture comprised of water and a polymeric component forming either a true solution, an emulsion or a sol. The use of furan resins greatly reduces the emissions of particular VOCs such as formaldehyde during the curing cycle. The present invention also provides a process of binding glass fibers and further provides for glass fiber compositions having applicability for use in a wide variety of end products.

Furan is traditionally defined as a heterocyclic ring compound with two carbon double bonds linking an oxygen atom on one side with a single carbon-carbon bond on the other. As used herein, furan resin is defined to include resinous products which are comprised of polymer molecules which contain the traditional furan ring structure as described above as well as the saturated analogs thereof. Such analogs will consist of five membered rings having four carbons and one oxygen and 0 to 1 carbon-carbon double bonds. The structures encompassed by this definition are illustrated below:

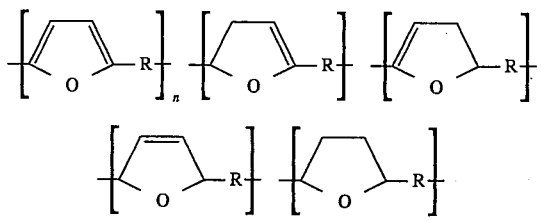

wherein R may be methylene; methylidyne; methylcarbonyl; methylester; methylene ether; methylene dioxy; ethylene; polymeric methylene ether wherein R is (—C$_2$—(OCH$_2$)$_n$—) and n may be from 1 to 10; ethylene methyl carbonyl; ethylene methyl ester; methylene oxy; ethyl oxy; and hydroxy methyl. Of these, it is most preferred that R be methylene, methylene ether, or polymeric methylene ether wherein n is 1 to 5.

R may also be characterized as the residue resulting from the polymerization of at least one reactant selected from the group consisting of:
furan, furfural, furfuryl alcohol,
5-hydroxymethyl-2-furancarboxyaldehyde,
5-methyl-2-furancarboxyaldehyde; 2-vinyl furoate,
5-methyl-2-vinylfuroate, 5-tertbutyl-2-vinyl furoate,
2-furfurylmethacrylate, 2-furfuryl methylmethacrylate,
2-vinyl furan, 5-methyl-2-vinyl furan,
2-(2-propylene)furan (or 2-methyl vinylidene furan),
5-methyl-2-methyl vinylidenefuran,
furfurylidene acetone, 5-methyl-2-furfurylidene acetone,
2-vinyl tetrahydrofuran, 2-furyl oxirane,
5-methyl-2-furyloxirane, furfuryl vinyl ether,
5-methyl-furfuryl vinyl ether,
vinyl 2-furyl ketone,
bis-2,5-carboxyaldehyde furan,
bis-2,5-hydroxymethyl furan,
5-hydroxymethyl-2-ethyl furanacrylate,
2,5-furandicarboxylic acid,
2,5-furan diacid dichloride,
2,5-furan dicarboxylic acid dimethyl ester,
2,5-furan methylamine,
5-carboxy-2-furan amine,
5-methylester-2-furan amine,
bis-(2,5-methylene isocyanate)furan,
bis(2,5-isocyante)furan,
2-isocyanatefuryl, and
2-methylene isocyanate furyl.

It will be appreciated that the composition of R will vary greatly as it is dependent upon the identity of the starting reactants and the mechanism of polymerization; "n" may be any value greater than 1 but will most preferably be no greater than 25.

One of the chief advantages in using furan-based binders stems from the fact that they are derived from vegetable cellulose. Suitable sources of vegetable cellulose are corn cobs, sugar cane bagasse, oat hulls, paper mill byproducts, biomass refinery eluents, cotton seed hulls, rice hulls, and food stuffs such as saccharides and starch. These materials undergo acid digestion to produce furfural. Furfural is the chief reagent used to produce materials such as furfuryl alcohol, 5-hydroxymethyl-2-furancarboxyaldehyde (HMF), 2,5-dicarboxyaldehydefuran, and bis(hydroxymethyl)furan (BHMF). These furan containing monomers in turn can undergo reactions to produce various furan containing monomers with a wide variety of substituents at the C2 and C5 positions.

Although furan resins may be identified via the names of the starting reactants (i.e., furfuralphenol resin or furfuryl alcohol resin) the term furan resin as used herein is intended to describe resins derived from a variety of starting reactants. Typically at least one of these reactants will contain the basic furan ring structure or the saturated analogs thereof. Accordingly, the term furan resin is further defined as a mixture comprised of oligomers resulting from the polymerization reaction wherein at least one of the reactants is selected from the group consisting of the furan containing molecule having the general formula:

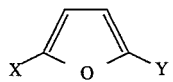

and its saturated analogs thereof having 0 to 1 carbon-carbon double bonds, wherein X and Y are independently organic substituent groups. This group is illustrated below:

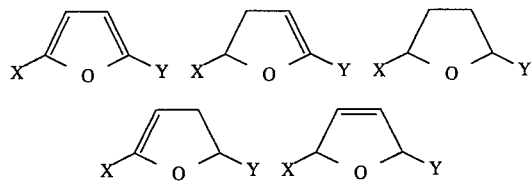

Suitable X and Y groups are those comprised of molecular species comprising one or more functional moieties selected from the group consisting of: hydrogen; C1–C10 alkyl groups; mono, di- or tri-substituted vinyl radicals; di- or tri-substituted aromatic rings; ketones; anhydrides; polysubstituted furfuryl; hydroxyls; aldehydes; carboxylic acids; esters; ethers; amines; imines; alkynes; alkyl halides; aromatic halides; olefinic halides; ethers; thiols; sulfides; nitriles; nitro groups; sulfones; and sulfonic acids. It will be appreciated that combinations of these various functional groups can be employed to form either X or Y.

Examples of specific compounds containing suitable X and Y groups include:
furan, furfural, furfuryl alcohol,
5-hydroxymethyl-2-furancarboxyaldehyde,
5-methyl-2-furancarboxyaldehyde, 2-vinyl furoate,
5-methyl-2-vinylfuroate; 5-tertbutyl-2-vinyl furoate,
2-furfurylmethacrylate, 2-furfuryl methylmethacrylate,
2-vinyl furan, 5-methyl-2-vinyl furan,
2-(2-propylene)furan (or 2-methyl vinylidene furan),
5-methyl-2-methyl vinylidenefuran;
furfurylidene acetone, 5-methyl-2-furfurylidene, acetone,
2-vinyl tetrahydrofuran, 2-furyl oxirane,
5-methyl-2-furyloxirane, furfuryl vinyl ether,
5-methyl-furfuryl vinyl ether,
vinyl 2-furyl ketone,
bis-2,5-carboxyaldehyde furan,
bis-2,5-hydroxymethyl furan,
5-hydroxymethyl-2-ethyl furanacrylate,
2,5-furandicarboxylic acid,
2,5-furan diacid dichloride,
2,5-furan dicarboxylic acid dimethyl ester,
2,5-furan methylamine,
5-carboxy-2-furan amine,
5-methylester-2-furan amine,
bis-(2,5-methylene isocyanate)furan,
bis(2,5-isocyante)furan,
2-isocyanate furyl, and
2-methylene isocyanate furyl.

It is preferred that X and Y be comprised of molecular species containing one or more functional moieties selected from the group consisting of hydrogen; C1–C6 alkyl groups; mono, di-, or tri-substituted vinyl radicals; ketones; hydroxyls; aldehydes; carboxylic acids; esters; ethers; amines; imines, and polysubstituted furfuryls.

It is furthermore particularly desired that at least one of X and Y be comprised of a molecular species comprising an oxygen containing functional moiety such as a ketone, hydroxyl, aldehyde, carboxylic acid, ester or ether.

It is most preferred that X and Y be comprised of methylol ($-C_2OH$) terminated groups. Accordingly, the most preferred furan resin for use in the glass fiber binding compositions described herein are those resins resulting from the polymerization of 2,5-bis(hydroxymethyl)furan. Such resins may be further defined as 'BHMF' resins.

These furan containing monomers can polymerize through two well known mechanisms. The first involves chain or polyaddition polymerization which is initiated by well known free radical, cationic or anionic promoters. This method of polymerization produces macromolecules with furan rings branching from the main chain. A comprehensive discussion of such reactions is provided by *Agricultural and Synthetic Polymers, Biodegradability and Utilization*; edited by J. E. Glass and G. Swift, Symposium sponsored by Divisions of Cellulose, Paper and Textile Chemistry; and Polymeric Materials: Science and Engineering at the 197th National Meeting of the American Chemical Society, Dallas, Tex., Apr. 9–14, 1989, herein incorporated by reference.

The second method is typically known as condensation polymerization. Polymers and copolymers resulting from acid catalyzed condensation reactions result in macromolecules with furan rings in the main chain. As a general rule, the furan resins formed by polycondensation reactions have stiffer chains and higher glass transition temperatures. These reactions may involve self condensation of the furan monomers described above, as well as condensation reactions of such monomers with aminoplast resins, organic anhydrides, aldehydes such as formaldehyde, ketones, urea, phenol and other suitable reagents. Most preferably the binder compositions described herein will contain furan resins produced by acid catalyzed condensation reactions.

The most preferred furan resin for use herein is Farez™ M, a commercially available composition from QO™ Chemicals, a division of Great Lakes Chemical Corporation, located in West Lafayette, Ind. The material safety data sheet (MSDS) for Farez™ M indicates that it is a furfuryl alcohol-urea formaldehyde resin containing about 6% free furfuryl alcohol and 0.4 to 1.1% by weight free formaldehyde. This resin is believed to be based on the most preferred furan monomer wherein X and Y are terminal methylol groups; i.e. bis(hydroxymethyl)furan ("BHMF").

Although Farez™ M has been found to be most suitable for use in the present invention, another material supplied by QO™ Chemicals, Inc. has also been found suitable. Quacorr™ 1300 is a commercially available resin believed to result from the acid catalyzed self condensation of furfuryl alcohol. Quacorr™ 1300 is received with a viscosity of about 2000 to 17,000 cPs at 25° C. It contains between 2 to 18% free furfuryl alcohol and is believed to have a substantial fraction of higher molecular weight oligomers. It has a percent nonvolatile between 72 to 98%.

Farez™ M, as received from QO™ Chemicals, Inc., has a pH of between 4.0 to 7.0, 13 to 17% by weight water and 4–7% by weight unreacted furfuryl alcohol. Because furfuryl alcohol volatilizes at 160° C. it is most preferred that its presence be minimized to decrease overall VOC. Farez™ M normally has a percent nonvolatile (% N.V.) of approximately 75%–90% and is received at a viscosity of between 250 cPs to 2,000 cPs at 25° C. A hydroxyl number of 17 to 21% has been measured for different batches of this material. Lower viscosities are strongly preferred.

The hydroxyl number or percent hydroxyl was determined using the following testing procedure. Approximately 1.2 grams of binder was dissolved in 25 milliliters of pyridine in a volumetric flask. Sufficient 3A molecular sieve was added to cover the bottom of the flask. The flask was shaken and left to stand overnight in order to remove any water present in the binder sample. Residual water was determined by the presence of a shoulder at 3560 cm$^{-1}$ and corrected by the addition of more 3A molecular sieve. A Perkin-Elmer 621 Grating Spectrophotometer, equipped with an infrared absorbance mode, was used to determine the hydroxyl number. The sample and reference cell were a pair of matching NaCl liquid cells with 0.05 to 0.10 mm path lengths and were scanned from 4000 cm$^{-1}$ to 3200 cm$^{-1}$. Absorbance was read at a peak maximum of 3240 cm$^{-1}$. Standard curves for each sample cell were generated by analyzing solutions containing 1.25, 0.625, 0,313, and 0.156 grams of furfuryl alcohol or bis(hydroxymethyl)furan per 25 ml dry pyridine. Solutions were scanned in NaCl liquid cells of path lengths 0.075 mm. A standard curve absorbance versus concentration was plotted and the percent hydroxyl calculated by extrapolating grams of hydroxyl per 25 ml sample and then dividing this value by the sample weight in grams and multiplying by 100.

Additional water is added to the material as received from QO™ Chemicals, Inc to make the glass fiber binders of the invention. Addition of water between 10% to 70% by weight produces acceptable viscosities of between 50 cPs to 600 cPs. However, it has been found that adding more than 15 to 17% by weight water to Farez™ M may produce nonhomogeneous mixtures. Although two-phase binders can provide desired properties, one-phase systems are most preferred. Thus, in the absence of the co-solvents discussed below, it is preferable that 13 to 17% by weight of water be added to the material as received from QO™ Chemicals, Inc. Such an addition results in approximately 30% total water by weight.

However, lower viscosities are normally preferred and viscosities in the range of 2 to 200 cPs at 25° C. are most preferred. These lower viscosities may be achieved by the addition of organic mono-, di-, and polyacids as co-solvents. Co-solvent is defined herein as any material which upon addition to the composition allows for the addition of greater amounts of water. These co-solvents are generally added in an amount equal to 2 to 10% by weight. Examples of suitable organic mono-, di-, and polyacids are methacrylic acid, propionic acid, levulinic acid, maleic acid, citric acid and succinic acid. Of these maleic acid is most preferred in an amount from 4 to 8% by weight.

A preferred binder composition will have a % NV from 50–65% resulting from the addition of 35–45% by weight of water, 5–6% by weight maleic acid and a final viscosity between 70–150% CPS at 25° C.

In addition to water and a co-solvent, an effective amount of one or more materials traditionally known as acid catalysts may be added to the furan resin as received from QO™ Chemicals. Acid catalysts for curing furan resins are well known in the art. Selection of a particular catalyst ultimately depends upon the desired rate of cure and desired end properties. A feature of the present invention is the choice of particular combinations of catalysts to minimize the release of VOC's originating from different resin components.

Materials known to be suitable for curing furan resins include inorganic and organic acids. Suitable organic acids include aliphatic saturated monocarboxylic acids, aliphatic unsaturated monocarboxylic acids, saturated and unsaturated dicarboxcylic acids, hydroxy acids, aromatic acids and diacids, and alicyclic acids. Examples of suitable acids include hydrochloric acid, sulfuric acid, nitric acid, phosphoric acid, benzene sulfonic acid, toluene sulfonic acid, xylene sulfonic acid, napthalene sulfonic acid, oleic acid, benzoic acid, salicylic acid, acetic acid, propionic acid, maleic acid, fumaric acid, oxalic acid, malonic acid, phthalic acid, lactic acid, succinic acid, glutaric acid, adipic acid, citric acid and levulinic acid. Of these toluene sulfonic acid and maleic acid are most preferred.

Friedel-Crafts type catalysts such as aluminum chloride, zinc chloride, aluminum bromide, and boron fluoride are also suitable.

Salts of both inorganic and organic acids may also be used. Examples of suitable inorganic acid salts are ammonium chloride, ammonium sulfate, ammonium hydrogen sulfate, ammonium nitrate, aluminum chloride, aluminum nitrate, aluminum sulfate, copper chloride, copper nitrate, copper sulfate. Of these, ammonium sulfate is most preferred.

Salts of organic acids are likewise expected to be suitable. Suitable salts are the urea salt of toluene sulfonic acid and the diammonium salts of citric acid.

Acid anhydrides are also suitable for use as catalysts in the present invention. In particular, cyclic anhydrides resulting from the dehydration of dicarboxylic acids are suitable for use in the present invention. Suitable acid anhydrides include acetic anhydride, maleic anhydride, succinic anhydride and phthalic anhydride. Of these maleic anhydride is most preferred. Although not wishing to be bound to any particular theory, it is believed that in addition to functioning as a catalyst, polyether co-polymers are formed between the anhydride and the free hydroxylated species present in the resin.

The most preferred materials are those which may be defined as latent catalysts which become active at approximately 110°–150° C. As discussed above, preferred materials are ammonium sulfate, the urea salt of toluene sulfonic acid, maleic acid and mixtures thereof. In particular, ammonium sulfate has been observed to preferentially reduce free formaldehyde emissions.

Although not wishing to be bound to any particular theory, it is believed that maleic acid, in addition to functioning as a co-solvent, also promotes the polymerization reaction. Furthermore, it is believed that maleic acid may preferentially reduce the emission of BHMF monomer during the curing process. Since it is desirable to maximize the reduction of VOC's, the most preferred 'catalyst' combination will be comprised of maleic acid and ammonium sulfate.

In addition to functioning as a true catalyst and as a co-solvent, it is further believed that maleic acid may modify the molecular structure of the most desirable BHMF resin via the following reaction:

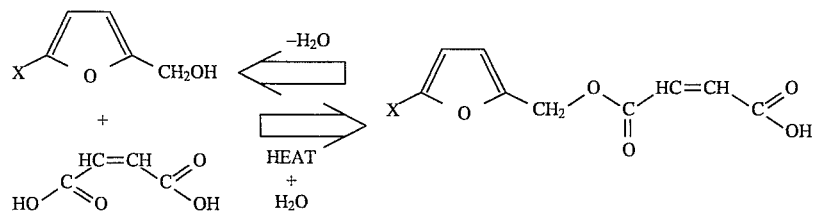

X may be either (—$C_2OH$) or a polymer chain. The remaining free acid group may act to 'catalyze' the reaction at conditions of elevated temperatures. Alternatively, however, the reaction may reverse itself under normal curing conditions to release free maleic acid. Although a catalyst has been traditionally defined as a substance whose presence changes the rate of a chemical reaction without undergoing permanent change in its composition, catalyst as used herein is further defined to include materials such as maleic acid and maleic anhydride whose molecular structure may be altered via reaction with the macromolecules of the furan resin.

Of course, it will be appreciated by those skilled in the art that this is an expected mechanism only.

It has been found that the catalyst or catalyst combination should be present in the binder in an amount equal to 1–15% by weight. Preferably, however the amount will be from 5 to 12% and most preferably 8–10% by weight. In particular, ammonium sulfate should be present in an amount of 8% by weight. Maleic acid should be present in the amount as previously described above.

In addition to the above, the aqueous compatible furan binder composition may further comprise compounds such as ammonia or urea in an amount equal to 0 to 5% by weight. Most preferred is the incorporation of urea in amounts from 0 to 2% by weight. It has been found that the incorporation of urea to the disclosed binder compositions can cause further reductions in the emission of free formaldehyde. It will be appreciated by those skilled in the art that other formaldehyde scavengers may be utilized.

In addition, silanes may be incorporated to improve the overall characteristics of the cured glass fiber/binder composition. Silanes appear to have the ability to improve recovery properties by facilitating an adhesive bond between the glass fiber surface and the furan resin.

Suitable silane coupling agents are Union Carbide A1100™, Union Carbide™ A1160, Union Carbide™ A-187, Alpha™ 41B, Dow-Corning™ Z6026 and Wacker™ B.S.-20. Wacker™ B.S.-20 is siloxane based. Experimental data showed a general trend in which all of the tested silanes narrowed the variability of recovery results from 40–70% to 60–70%. Reactive silanes are preferred for use in the present invention. In particular those silanes with reactive groups such as primary amines and -uriedo are most preferred.

Accordingly, it is most preferred that the aqueous compatible furan binder compositions of the invention contain reactive silanes in an amount from 0.05–0.50% by weight and most preferably approximately 0.2% by weight. However, the actual amount incorporated will be dependent upon the reactivity of the silane and can be determined by one skilled in the art.

It is also anticipated that coupling agents such an organotitanates and organozirconates are suitable for use in the present invention. The amounts of such coupling agents to be incorporated will depend upon the agent's particular chemistry.

It will be appreciated by those skilled in the art that additional materials such as extenders to reduce cost and coloring agents may also be incorporated without departing from the spirit of the invention. Examples of suitable extenders are silica, alumina, and calcium carbonate. Examples of suitable coloring agents are red dye 42 and similar such materials.

Surfactants may also be added to the furan binder compositions of the instant invention. It has been found that sodium dodecyl sulfonate is a suitable surfactant. It may be added in an amount equal to 0.05 to 1.0% by weight.

The most preferred glass fiber binding compositions are illustrated in Table 1 below.

TABLE 1

| Material | Example A % By Weight | Example B % By Weight | Example C % By Weight |
| --- | --- | --- | --- |
| Farez ™ M/BHMF Resin | 69.9 | 68.4 | 79.4 |
| Water | 24.4 | 23.9 | 15.8 |
| Maleic Acid | 3.5 | 5.4 | 0.0 |
| Ammonium Sulfate | 2.1 | 2.1 | 4.7 |
| Silane (A1100) | 0.2 | 0.2 | 0.2 |

The invention further comprises glass fiber compositions made according to the present invention.

As discussed above, the amount of binder present on the glass fiber composition depends in large part on the performance requirements of the finished product. The amount of resin on a cured glass fiber mat is typically determined by the loss on ignition test (L.O.I.). After ignition of a weighed, cured glass fiber/binder sample at 950° F., the total percent weight loss is determined. This value represents the amount of thermoset binder originally present. The compositions of this invention should contain 1 to 25% by weight cured resin or % L.O.I. Preferably, such systems will contain 2 to 18%

L.O.I. It is most preferred that L.O.I. values for the compositions of the instant invention range from 4 to 12%.

It is anticipated that the glass fiber/binder compositions of the instant invention will be darker in color than glass fiber batts produced with traditional phenol formaldehyde binders. However, in many cases the dark color and thermal resistance of furan based binders are favored for many OEM and industrial fiber glass markets, such as duct and furnace liners and automotive hoodliners.

One of the most desirable properties required of glass fiber/binder compositions is a high compressibility ratio of between 4–12:1 and recovery values of between 40 to 100%. This is especially true of glass fiber products with densities of approximately ½ pound to 1 pound per cubic foot. As previously discussed, such materials have great applicability for use in insulation.

The recovery of a glass fiber/binder composition is generally tested via the following method known as the "Recovery test". Cured glass fiber/binder compositions having densities of between 0.5 to 1.0 pound per cubic foot are compressed to densities of approximately 2.0 to 4.0 pounds per cubic foot. The compressed materials are inserted into humidity cabinets and are subjected to temperatures of between 25° to 70° C. at 95% R.H. After 2 to 500 hours, the samples are uncompressed and left to recover for a period of 1.0 hour. Their resultant "recovered" thicknesses are measured and the percent recovery calculated as a percentage of the initial thickness.

Most preferably, the glass fiber compositions disclosed herein will recover between 60 to 100% of their initial thickness and most preferably between 70–100%.

Although not wishing to be bound to any particular theory, it is believed that the ability of the glass fiber compositions to recover is substantially influenced by the modulus of the glass fibers themselves. As a result, the distribution of the binder on the glass fibers affects not only the movement of the individual glass fibers but also the collective overall movement and hence the recovery characteristics.

Accordingly, it is most preferred that the aqueous compatible furan resins of the instant invention be present mainly at the glass fibers junctions.

Furthermore, the number and size of the binder-junction furan resin particles appears to have a direct effect on recovery properties. It is also believed that some sheathing of the glass fibers by the binder may contribute to the recovery properties of the fiber glass batt. However, it will be appreciated that in the glass fiber/binder compositions of the instant invention, the binder does not completely fill the interstitial space surrounding the individual glass fibers.

Figure 2:
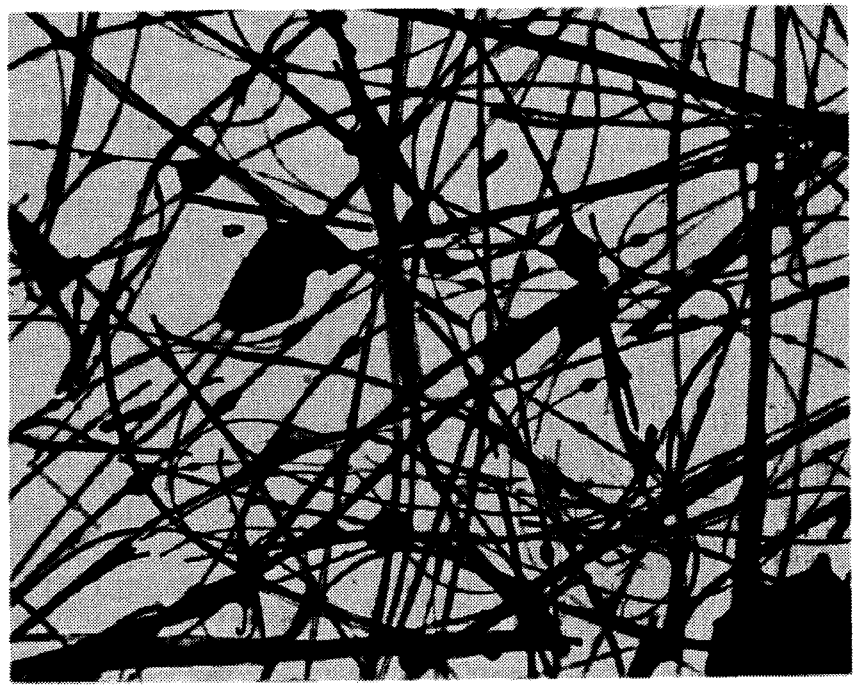
FIG. 2 illustrates a desired distribution of a 40% N.V. bis(hydroxmethyl)furan resin based binder applied to glass fibers at a magnification of 79×.

FIGS. 1 and 2 illustrate acceptable distributions of binder on glass fibers. FIGS. 1 and 2 illustrate acceptable distributions of bis(hydroxymethyl)furan resin-based binders. The binder of FIG. 1 has ammonium sulfate as catalyst. The binder of FIG. 2 contains a combination of maleic acid and ammonium sulfate. Compositions of the binders used to produce the illustrated distributions are given in Table 2.

FIGS. 1 and 2 also represent different methods of binder application. FIG. 1 illustrates binder distribution derived from applying the binder through a fiberglass column expander whereas FIG. 2 shows distribution resulting from application through an air assisted spray nozzle.

As Table 3 shows, both binder systems and application methods produced fiberglass product with acceptable recoveries. There is a sufficient proportion of bonded junction points to non-bonded junction points in both figures to provide adequate product recovery. It is believed that the average size of such binder-junction particles should most preferably be no larger than 1 to 20 times the average fiber diameter.

TABLE 2

Binder Compositions of FIGS. 1 and 2

| Raw Materials | FIG. 1 (66% N.V.) | FIG. 2 (40% N.V.) |
|---|---|---|
| Farez ™ M | 79.23 | 69.34 |
| Catalysts | | |
| Maleic Acid | — | 3.47 |
| (NH$_4$)$_2$SO$_4$ | 4.75 | 2.77 |
| % H$_2$O Added | 15.85 | 24.27 |
| Silane A-1100 | 0.17 | 0.15 |

TABLE 3

| Binder System | % LOI | Binder Junction Size (µ$^2$) | % Recovery 2 Hrs |
|---|---|---|---|
| FIG. 1 | 5.8 | 1000 | 70.8 |
| FIG. 2 | 8.3 | 6700 | 74.0 |

Some coating of the shafts of the individual fibers is advantageous in that it diminishes abrasion among individual fibers. This destructive self-abrasion reduces overall strength and hence recovery of the composition because it increases the likelihood of fiber breakage. However, it is not desirable for the furan binder to coat all fibers nor to fill all interstitial space between and around the individual glass fibers in a mat of the same.

The invention further comprises a process for binding glass fiber compositions with the aqueous compatible furan resin compositions described herein. Glass fiber compositions made according to this process have recovery properties sufficient to allow them to be used in a wide variety of end use applications including insulation and or filtration and or separation applications. In addition, the high acid resistance of furan based binders makes them suitable for filtration applications.

It is most preferred that the furan binder compositions disclosed herein and intended to be used in the process of the invention have a viscosity from 2–200 cPs at a % N.V. from 2 to 70%. It is desirable that such compositions be homogeneous one phase mixtures. However, mixtures having a two phase composition can provide the desired performance properties.

Application of the previously disclosed furan binder compositions will be to newly formed glass fibers using known prior art fiber manufacturing methods. Most preferably, the binder will be applied to the newly formed glass fibers in mid air prior to their collection as described below.

Suitable manufacturing processes are the well known rotary process or pot and marble process. The rotary process is described on pages 12–14 of "Fiber Glass" by Mohr & Rowe previously referenced above.

Delivery of the binder in such processes may be achieved via the use of standard (air less) spray systems, column expanders or conventional air assisted spray equipment. It is most preferred that conventional air assisted spray equipment be used as described in U.S. Pat. No. 4,832,723, issued May 23, 1989 to Shisler et al., which is incorporated by reference.

Most preferably, the newly formed glass fibers with a binder sprayed thereon are collected on a moving chain as a loose blanket. This chain is pulled into an oven wherein the blanket is partially compressed as it is going through the oven to achieve desired blanket thickness. As the blanket is squeezed between the oven flights, hot air is pumped through the blanket via a series of internal plenums or air ducts.

Although not wishing to be bound to a particular theory, it is believed that cure may be a variable effecting reduced V.O.C. emissions. A desirable cure for VOC purposes is a cure cycle wherein the temperature is increased from ambient of a rate of between 10°–20° C. per minute up to as low as a final a temperature as possible, preferably 150° C. This type of cure cycle is defined herein as a 'ramp cure'. Given appropriate oven conditions this should result in an optimum cure cycle of 10 minutes or less at 150° C. However, oven temperatures between 75°–250° C. may be used as long as the residence time in the oven is adjusted accordingly. Currently, the most preferred cure cycle for the compositions illustrated in Table 1 is 8 minutes at an oven temperature of 177° C.

Of course it will be appreciated that the desired cure cycle is affected by the strength of the chosen acid catalyst. For example, in some situations such as the preparation of blown wool (i.e. fiber glass that is to be blown into position in order to give a particular form of insulation), a relatively strong acid catalyst such as para-toluene sulfonic acid (PTSA) may be chosen. With a $pK_a$ of approximately 0.5 to 2.5, this acid causes the furan resin to cure almost instantly on the glass fiber. Such a cure rate is acceptable because the glass fiber/binder composition does not need to undergo any forming process in the oven. In many cases this type of fiber glass will be reduced in size prior to its end use application.

In another application, the fiber glass and binder will be collected and packaged prior to cure. This material is known as uncured wool and is cured via a molding process. It may be molded in-house or packaged and transported to an outside molding facility. Suitable catalysts for this application are the latent catalysts discussed above. Most preferably the catalyst will be a 5:3 wt:wt, maleic acid and ammonium sulfate mixture, present in an amount equal to 7% by weight. Such molded glass fiber compositions normally have 5 to 25% by weight cured resin or % L.O.I. It is preferred that they have 5 to 20% by weight catalyst.

This uncured wool is typically molded in a 300°–500° F. flat press at 45 second or less intervals. The resulting materials may be utilized in various automotive applications such as headliners. Although compressed, it should be noted that the resulting glass fiber compositions are air permeable. Although, the individual glass fibers may be coated, the furan binder does not fill the interstitial space in the finished article.

The following examples are provided to illustrate the invention but are not intended to limit the invention. All degrees are centigrade and all parts are by weight percent unless otherwise indicated.

EXAMPLE 1

Formaldehyde emissions were initially studied with tube furnace tests.

Compositions of the various samples tested are illustrated below in Table 4. "Farez M™" denotes the resin previously described and supplied by QO Chemicals, while '1300' denotes the use of Quacorr™ 1300 as received from QO Chemicals. Any catalysts used or other materials added are identified to the right of the resin. Preparation of the samples consisted of mixing the various components together under a typical laboratory mixing apparatus.

TABLE 4

| Sample No. | Sample/Catalyst | Total gm/resin | % resin** | % solid resin# | Total gm cat. | % cat.** | % solid cat.# | solid res/cat ratio | ident. other | gm other | % other** | % solids other |
|---|---|---|---|---|---|---|---|---|---|---|---|---|
| 1 | Farez ™ M/Citric | 12.0 | 83.2 | 85.0 | 2.41 | 16.7 | 50.0 | 8.46 | A1100 | 0.01 | 0.08 | 100.00 |
| 2 | Farez ™ M/Citric | 12.0 | 83.2 | 85.0 | 2.41 | 16.7 | 50.0 | 8.46 | A1100 | 0.01 | 0.08 | 100.00 |
| 3 | Farez ™ M/Citric | 12.0 | 83.2 | 85.0 | 2.41 | 16.7 | 50.0 | 8.46 | A1100 | 0.01 | 0 08 | 100.00 |
| 4 | Farez ™ M/Citric | 12.0 | 83.2 | 85.0 | 2.41 | 16.7 | 50.0 | 8.46 | A1100 | 0.01 | 0 08 | 100.00 |
| 5 | Farez ™ M/Citric | 12.0 | 71.3 | 85.0 | 4.82 | 28.7 | 25.0 | 8.46 | none | 0.00 | 0.00 | 0.00 |
| 6 | 1300/Citric | 12.0 | 83.3 | 100.0 | 2.41 | 16.7 | 50.0 | 9.96 | none | 0.00 | 0.00 | 0.00 |
| 7 | 1300/ZnCl$_2$ | 12.0 | 83.3 | 100.0 | 2.41 | 16.7 | 50.0 | 9.96 | none | 0.00 | 0.00 | 0.00 |
| 8 | 1300/AlCl$_2$ | 12.0 | 71.3 | 100.0 | 4.82 | 28.7 | 25.0 | 9.96 | none | 0.00 | 0.00 | 0.00 |
| 9 | 1300/H$_3$PO$_4$ | 12.0 | 83.3 | 100.0 | 2.41 | 16.7 | 10.0 | 49.79 | none | 0.00 | 0.00 | 0.00 |
| 10 | 1300/H$_3$PO$_4$/ACN# | 6.0 | 45.4 | 100.0 | 1.21 | 9.2 | 10.0 | 49.59 | ACN | 6.00 | 45.42 | 0.00 |
| 11 | 1300/H$_3$PO$_4$/urea | 12.0 | 83.2 | 100.0 | 1.21 | 8.4 | 20.0 | 49.59 | urea | 1.21 | 8.39 | 100.00 |
| 12 | 1300/H$_3$PO$_4$/urea | 12.0 | 83.2 | 100.0 | 1.21 | 8.4 | 20.0 | 49.59 | urea | 1.21 | 8.39 | 100.00 |
| 13 | 1300/H$_3$PO$_4$/urea | 12.0 | 83.1 | 100.0 | 1.22 | 8.5 | 20.0 | 49.14 | urea | 1.21 | 8.39 | 100.00 |
| 14 | 1300/H$_3$PO$_4$/urea | 12.0 | 83.1 | 100.0 | 1.22 | 8.5 | 20.0 | 49.14 | urea | 1.21 | 3.39 | 100.00 |
| 15 | Far M/H$_3$PO$_4$/Urea | 12.0 | 83.1 | 85.0 | 1.23 | 8.5 | 20.0 | 41.43 | urea | 1.21 | 8.39 | 100.00 |
| 16 | Far M/H$_3$PO$_4$/Urea | 12.0 | 83.1 | 85.0 | 1.23 | 8.5 | 20.0 | 41.43 | urea | 1.21 | 8.39 | 100.00 |
| 17 | Far M/(NH$_4$)$_2$SO$_4$ | 12.0 | 83.3 | 85.0 | 2.40 | 16.7 | 40.0 | 10.63 | none | 0.00 | 0.00 | 0.00 |
| 18 | 1300/(NH$_4$)$_2$SO$_4$ | 12.0 | 83.0 | 100.0 | 2.45 | 17.0 | 40.0 | 12.24 | none | 0.00 | 0.03 | 0.00 |
| 19 | Farez ™ M/H$_3$PO$_4$ | 12.0 | 83.3 | 85.0 | 2.41 | 16.7 | 10.0 | 42.36 | none | 0.00 | 0.00 | 0.00 |
| 20 | Farez ™ M/neat | 12.0 | 100.0 | 85.0 | 0.00 | 0.0 | 0.0 | #DIV/01 | none | 0.00 | 0.00 | 0.00 |

ACN = acetonitrile used to improve solubility of Quacorr ™ 1300.
* = the balance of this material is water.
** = % of initial charge these should sum to 100%.

The tube furnace is used to heat samples in a controlled environment designed to simulate a fiber glass binder curing process. It consists of a glass tube, about one foot long and with a one inch inside diameter, wrapped with a nickel-chromium wire heater and surrounded with a vacuum jacket. The temperature inside the furnace can be monitored by a thermocouple in the thermocouple well placed between the heater wire and the wall of the inside tube.

Sample support consisted of a glass microfiber filter (Whatman 5.5 cm GF/B) inside a carrier consisting of a 1.5 inch long piece of 0.75 inch diameter Pyrex™ glass tubing. Between 0.15 and 0.90 gram of the final binder solution was placed and weighed to the nearest 0.1 mg on the filter. The sample support and sample were placed near the outlet end of the tube furnace and the cap replaced. Dry air or an inert gas was used to sweep the inside of the tube.

Volatile formaldehyde, released by the curing sample, was trapped and measured using two impingers connected in series downstream from the exit of the tube furnace. Into each of impingers was placed 20 ml of a trapping solution comprised of 2.50 gm of 2,4-dinitrophenylhydrazine in 1000 ml of acetonitrile solvent that also contained 5 ml of glacial acetic acid (to facilitate the reaction between the 2,4-dinitrophenylhydrazine and formaldehyde), and a small, accurately known quantity, of diethyl phthalate as an internal standard. The reaction between 2,4-dinitrophenylhydrazine and formaldehyde to form a stable 2,4-dinitrophenylhydrazone derivative is well known to those skilled in the art of analytical organic chemistry and need not be discussed further here.

In initial work (see Tables 5 and 6), these trapping solutions were used directly. However, it was subsequently observed that the acetic acid caused some polymerization of the furfural alcohol and BHMF monomer trapped in the impinger solutions. In later work, (see Table 7), a "Split Impinger Solution" technique was used where the solution used in the impingers was solely acetonitrile. After the tube furnace run a portion of the impinger solution was analyzed directly for furfuryl alcohol and BHMF monomer, and a second accurately measured aliquot was diluted 1:1 with the 2,4-dinitrophenylhydrazine solution described above and analyzed for formaldehyde.

Two methods were used to determine the concentration of formaldehyde, furfuryl alcohol and BHMF monomer captured by the impinger solutions. A GC mass spectrometer (GC/MS) was utilized with a 30 meter DB-5 column with 0.25 micron film thickness, an oven temperature program of 70° C. for three minutes then ramped to 260° C. for 4.7 minutes at 30° C./minute. The injector temperature was 280° C. with a transfer line and trap temperature of 270° C. The scan rate was one scan per second and the range 45 to 450 AMU. Alternatively, high pressure liquid chromatography (HPLC) could be utilized with a one Nova-Pak phenyl column, a mobile phase comprised of a linear gradient 10% methanol, 90% water and 1% acetic acid. A UV detector was used at 274 nm for phenols and 360 nm for the formaldehyde-2,4-dinitrophenylhydrazone derivative.

Representative results from tube furnace burns of the compositions in Table 4 are illustrated below in Table 5:

TABLE 5

| Sample No. | Sample/Catalyst | Burn Time Min. | Burn Deg. C. | start wt grams | final wt grams | µg $CH_3O$/gm samp. solid |
|---|---|---|---|---|---|---|
| 1 | Farez ™ M/Citric | 30 | 150 | 0.0983 | 0.0361 | 2969 |
| 2 | Farez ™ M/Citric | 30 | 125 | 0.1013 | 0.0368 | 3144 |
| 3 | Farez ™ M/Citric | 15 | 125 | 0.1019 | 0.0337 | 2514 |
| 4 | Farez ™ M/Citric | 30 | 100 | 0.1002 | 0.0321 | 2007 |
| 5 | Farez ™ M/Citric | 30 | 150 | 0.2779 | 0.1854 | 4997 |
| 6 | 1300/Citric | 30 | 100 | 0.2582 | 0.2112 | 1591 |
| 7 | 1300/$ZnCl_2$ | 30 | 100 | 0.2509 | 0.2131 | 348 |
| 8 | 1300/$AlCl_2$ | 30 | 100 | 0.2643 | 0.1885 | 825 |
| 9 | 1300/$H_3PO_4$ | 30 | 125 | 0.2438 | 0.1964 | 1599 |
| 10 | 1300/$H_3PO_4$/ACN* | 30 | 125 | 0.2556 | 0.1173 | 3595 |
| 11 | 1300/$H_3PO_4$/urea | 30 | 125 | 0.2570 | 0.1940 | 0 |
| 12 | 1300/$H_3PO_4$/urea | 25 | 150 | 0.2539 | 0.1654 | 193 |
| 13 | 1300/$H_3PO_4$/urea | 4 | 125 | 0.2567 | 0.1857 | 0 |
| 14 | 1300/$H_3PO_4$/urea | 25 | 125 | 0.2567 | 0.1857 | 0 |
| 15 | Farez ™ M/$H_3PO_4$/Urea | 4 | 125 | 0.2679 | 0.1826 | 0 |
| 16 | Farez ™ M/$H_3PO_4$/Urea | 25 | 123 | 0.2695 | 0.1869 | 0 |
| 17 | Farez ™ M($NH_4)_2SO_4$ | 30 | 125 | 0.2676 | 0.1666 | 196 |
| 18 | 1300($NH_4)_2SO_4$ | 30 | 125 | 0.2516 | 0.1953 | 696 |
| 19 | Farez ™ M/$H_3PO_4$ | 25 | 125 | 0.3346 | 0.2063 | 9255 |
| 20 | Farez ™ M(neat) | 25 | 125 | 0.2399 | 0.1757 | 3411 |

*ACN = acetonitril used to improve solubility of Quacorr ™ 1300.

The results illustrated above indicated that substantial reductions in formaldehyde emissions are possible with the use of aqueous soluble furan based binder compositions.

EXAMPLE 2

Additional tube furnace studies were conducted.

Samples consisted of QO Chemicals' Farez™ M BHMF resin (identified as "Farez M" below) and various catalysts and cure cycles. Compositions consisted of 100.0 grams of Farez™ M and the amount of catalyst identified below. 15 gm of water was added to each sample. The tube furnace apparatus utilized was identical to that described in Example 1. Results are illustrated in Table 6.

Emissions of formaldehyde, furfuryl alcohol, and monomeric BHMF are reported in the sixth, seventh, and eighth columns and are given in units of micrograms (µg) of material per gram of sample solids.

TABLE 6

| Sample No. | Catalyst | Conditions | Sample Wt./gm | wt cat 100 gm resin | CH$_2$O/μg/gm slds. resin* | FA μg/gm slds. resin* | BHMF μg/gm slds. resin* | % resin retn |
|---|---|---|---|---|---|---|---|---|
| 1 | (NH$_4$)HSO$_4$ | 150C./30 min | 0.2375 | 10 | 3150.15 | 7993.02 | 17.44 | 81.62 |
| 2 | (NH$_4$)HSO$_4$ | 150C./30 min | 0.2759 | 10 | 869.50 | 983.61 | 4.73 | 82.73 |
| 3 | (NH$_4$)$_2$SO$_4$ | 150C./30 min | 0.1222 | 10 | 0.00 | 23823.67 | 233.21 | 76.47 |
| 4 | (NH$_4$)$_2$SO$_4$ | 150C./30 min | 0.1277 | 10 | 0.00 | 27537.17 | 201.09 | 74.65 |
| 5 | H$_3$PO$_4$ | 150C./30 min | 0.2524 | 10 | 3964.11 | 1690.73 | 37.41 | 70.67 |
| 6 | H$_3$PO$_4$ | 150C./30 min | 0.2554 | 10 | 4239.39 | 1807.01 | 0.00 | 71.06 |
| 7 | H$_3$PO$_4$ | 150C./30 min | 0.2439 | 5 | 4035.67 | 11950.98 | 30.73 | 70.40 |
| 8 | H$_3$PO$_4$ | 150C./30 min | 0.248 | 5 | 193.49 | 1681.69 | 27.19 | 70.69 |
| 9 | Citric Acid | 150C./30 min/2-4 hrs | 0.2479 | 5 | 5929.97 | 16012.63 | 739.92 | 66.97 |
| 10 | Citric Acid | 150C./30 min/2-4 hrs | 0.2533 | 5 | 5452.56 | 14906.19 | 842.81 | 66.06 |
| 11 | Citric Acid | 150C./30 min | 0.2479 | 10 | 3913.94 | 13560.88 | 114.03 | 75.38 |
| 12 | Citric Acid | 150C./30 min | 0.245 | 10 | 3939.43 | 13529.42 | 134.10 | 73.61 |
| 13 | (NH$_4$)$_2$SO$_4$ | 150C./30 min | 0.2345 | 5 | 275.58 | 13130.89 | 99.34 | 71.16 |
| 14 | (NH$_4$)$_2$SO$_4$ | 150C./30 min | 0.2469 | 5 | 264.60 | 16143.65 | 216.60 | 70.72 |
| 15 | Levulinic Acid | 150C./30 min | 0.2509 | 10 | 3678.54 | 17284.21 |  | 55.77 |
| 16 | Blank | 150C./30 min | 0.243 | 0 | 993.01 | 14113.46 | 218.34 | 69.92 |
| 17 | Blank | 150C./30 min | 0.2431 | 0 | 935.14 | 13904.93 | 300.60 | 68.65 |

*Acidified impinged solution may have caused some polymerization of the trapped FA and BHMF monomers, thus actual values may be higher than shown in Table 6.

The above studies illustrate that overall VOC emissions can be controlled by catalyst selection and choice of cure cycle.

EXAMPLE 3

Further tube furnace studies using refined analytical techniques involving the split impinger solutions described in Example 1 gave improved results as to the amounts of furfuryl alcohol and BHMF monomer and are presented in Table 7. In all of these examples, 15 gm of water was added to 100 gm of resin. It will be appreciated that by judicious choice of catalyst(s) the amount of either formaldehyde or BHMF monomer released can be reduced to almost zero.

The illustrated catalysts were added to Farez™ M samples in the amounts provided below. No additional water was added. All samples underwent a burn temperature cure of 30 minutes at 150° C. In Table 7, the values "wt. cat. gm" refer to the amount of catalyst added per 10 gm of resin and the "sample wt in gm" refers to the amount of catalyzed material placed in the tube furnace.

TABLE 7

| Catalyst(s) | Sample wt. gm | wt cat. gm | CH$_2$O/μg/gm resin | FA μg/gm resin | BHMF μg/gm resin | % resin retn |
|---|---|---|---|---|---|---|
| (NH$_4$)$_2$SO$_4$ | 0.2562 | 0.60 | 0.00 | 45175.56 | 2163.12 | 61.14 |
| (NH$_4$)$_2$SO$_4$ | 0.251 | 0.60 | 0.00 | 41455.27 | 2768.22 | 60.00 |
| (NH$_4$)$_2$SO$_4$ | 0.2551 | 0.60 | 0.00 | 44993.64 | 2458.01 | 60.67 |
| (NH$_4$)$_2$SO$_4$ | 0.2654 | 0.40 | 2092.72 | 44212.22 | 3494.99 | 57.12 |
| (NH$_4$)$_2$SO$_4$ | 0.2325 | 0.40 | 2126.68 | 41116.15 | 3592.42 | 57.73 |
| (NH$_4$)$_2$SO$_4$ | 0.2505 | 0.40 | 1936.44 | 44226.18 | 4019.40 | 57.20 |
| (NH$_4$)$_2$SO$_4$ | 0.2633 | 0.20 | 3496.49 | 45227.39 | 9230.41 | 47.38 |
| (NH$_4$)$_2$SO$_4$ | 0.2586 | 0.20 | 3040.60 | 41266.57 | 8372.24 | 48.85 |
| (NH$_4$)$_2$SO$_4$ | 0.2705 | 0.20 | 2912.20 | 40345.31 | 9332.02 | 47.97 |
| (NH$_4$)$_2$SO$_4$/Maleic Acid[1] | 0.2447 | 0.90 | 1084.02 | 16336.16 | 0.00 | 69.81 |
| (NH$_4$)$_2$SO$_4$/Maleic Acid[1] | 0.2536 | 0.90 | 928.24 | 29365.00 | 0.00 | 67.92 |
| (NH$_4$)$_2$SO$_4$/Maleic Acid[1] | 0.2499 | 0.90 | 1220.66 | 28414.19 | 0.00 | 68.49 |
| (NH$_4$)$_2$SO$_4$/Maleic Acid[1] | 0.2942 | 0.70 | 2169.22 | 96597.94 | 143.09 | 69.34 |
| (NH$_4$)$_2$SO$_4$/Maleic Acid[1] | 0.2494 | 0.70 | 2287.87 | 49540.46 | 0.00 | 67.32 |
| (NH$_4$)$_2$SO$_4$/Maleic Acid[1] | 0.2562 | 0.70 | 1951.48 | 35912.46 | 0.00 | 68.66 |
| Maleic Acid | 0.2459 | 0.50 | 6220.02 | 60365.50 | 910.35 | 63.61 |
| Maleic Acid | 0.2578 | 0.50 | 9212.02 | 40516.11 | 976.05 | 62.61 |
| Maleic Acid | 0.2606 | 0.50 | 6370.30 | 55027.20 | 550.68 | 65.97 |
| Maleic Acid | 0.2479 | 0.75 | 6023.42 | 17118.10 | 0.00 | 69.99 |
| Maleic Acid | 0.2588 | 0.75 | 7581.72 | 16208.22 | 0.00 | 71.03 |
| Maleic Acid | 0.2674 | 0.75 | 7094.98 | 12705.97 | 0.00 | 71.13 |
| Maleic Acid | 0.2571 | 1.00 | 5507.66 | 11453.49 | 0.00 | 72.46 |
| Maleic Acid | 0.2574 | 1.00 | 5431.68 | 13558.01 | 0.00 | 72.53 |
| Maleic Acid | 0.2698 | 1.00 | 5278.40 | 9690.45 | 0.00 | 73.25 |
| (NH$_4$)$_2$SO$_4$/Maleic Acid[3]* | 0.2594 | 0.43 | 3285.02 | 49005.85 | 0.00 | 49.96* |

TABLE 7-continued

| Catalyst(s) | Sample wt. gm | wt cat. gm | CH$_2$O/μg/gm resin | FA μg/gm resin | BHMF μg/gm resin | % resin retn |
|---|---|---|---|---|---|---|
| (NH$_4$)$_2$SO$_4$/Maleic Acid[3*] | 0.3041 | 0.43 | 2309.06 | 49759.43 | 0.00 | 50.84* |
| (NH$_4$)$_2$SO$_4$/Maleic Acid[3*] | 0.2651 | 0.43 | 3279.16 | 53855.73 | 0.00 | 45.290 |
| Blank | 0.2594 | 0.00 | 4261.02 | 47277.61 | 6913.63 | 46.32 |
| Blank | 0.2516 | 0.00 | 4197.82 | 42848.13 | 6029.06 | 49.43 |
| Blank | 0.2493 | 0.00 | 4429.02 | 53313.74 | 5940.61 | 49.93 |

*The Farez ™ M resin in them samples consisted of an aqueous extract "stripped" from Farez ™ M resin as received from QO Chemicals. Equal parts water and Farez ™ M were stirred vigorously for one hour and then allowed to stand without stiffing for one hour. The aqueous portion was decanted off and used as the base resin.
[1]The ratio of ammonium sulfate to maleic acid was equal to 4:5.
[2]The ratio of ammonium sulfate to maleic acid was equal to 2:5.
[3]*The ratio of ammonium sulfate to maleic acid was equal to 3:5.

EXAMPLE 4

The purpose of this experiment was to establish the ability of silanes to improve moisture resistance in the bonded fibers. Samples without silane had been showing recovery results ranging from 40 to 70%.

Binderless fiber glass batts were prepared by subjecting commercial insulation batts from Schuller International, Inc., type "R-19", to 950° F. to burn out the binder. The "burned out" batts were sliced horizontally into strips approximately ⅜ inch in thickness. Furan binders consisting of 100 grams Farez™ M resin, 6 grams ammonium sulfate, 20 grams water, and a quantity of silane based on its individual activity was sprayed onto both sides of each strip. The three strips were combined and cured at 425° F. for 10 minutes to make up one sample. The brand and quantity of silane used were as follows: Union Carbide A1100, 0.2 parts; Union Carbide A1160, 0.4 parts; Union Carbide A-187[1], 0.2 parts; Alfa 41B[2], 0.2 parts; Dow-Corning Z-6026[3], 0.1 part; and Wacker BS-20[4], 0.5 parts.

[1] A1100 and A1160 are tradenames of Union Carbide.
[2] 41B is a tradename of Alfa.
[3] Z-6026 is a tradename of Dow-Corning.
[4] 4 BS-20 is a tradename of Wacker Silicones.

Four 6"×6" test specimens were cut from each prepared sample, weighed, and measured for thickness. Then the specimens were compressed to one quarter of their original thickness and placed in a humidity cabinet at 155° F. and 95% R.H. for two hours. After removal, the specimens were left to cool undisturbed for 30 minutes and then allowed to expand. Following an hour of specimen equilibration, their thicknesses were again measured. The samples were then reheated to 950° F. for binder determination. (% L.O.I.)

Sample recovery, density and binder values are summarized below.

| Silane | Sample Density | % L.O.I. | % Recovery |
|---|---|---|---|
| UC A-187 | 0.51 | 7.85 | 59.6 |
| BS-20 | 0.55 | 6.04 | 67.1 |
| UC A-1100 | 0.64 | 4.19 | 65.5 |
| UC A-1160 | 0.50 | 6.94 | 59.9 |
| DCZ6026 | 0.56 | 5.08 | 68.0 |
| Alfa 41B | 0.58 | 4.26 | 63.4 |

Samples containing A-187 silanes stuck to the compression plates and those with Z6026 tended to stick although not as tenaciously as the A-187 samples. However, none of the silane containing samples bonded to the plates as strongly as previously tested samples without silane.

A general trend can be seen and summarized in that all silanes tested reduced recovery variability from 40–70% to 60–70%.

EXAMPLE 5

A pilot trial using the furan resin based binders of the invention was conducted. Compositions of the various binders tested are illustrated in Table 8.

TABLE 8

| Sample No. | Farez ™ M lbs. | (NH$_4$)$_2$SO$_4$ lbs. | Maleic Acid lbs | Water lbs | Silane/lbs | Selected Other | Viscosities |
|---|---|---|---|---|---|---|---|
| 1 | 29.8 | 1.788 | 0 | 5.96 | A1100, 0.22 | | |
| 2 | 30 | 1.9 | 0 | 6 | | 1055 cPs | |
| 3 | 31.9 | 1.914 | 0 | 6.38 | A1101, 0.22 | | |
| 4 | 28.6 | 1.716 | 0 | 5.72 | A1160, 0.4 | | |
| 5 | 31.2 | 1.972 | 0 | 6.24 | BS20, 1 | | 960 cPs |
| 6 | 31.5 | 1.89 | 0 | 6.3 | A1101, 0.22 | | |
| 7 | 32.9 | 1.974 | 0 | 6.59 | A1101, 0.22 | Red Dye | |
| 8 | 26.1 | 0.793 | 1.305 | 9.14 | A1101, 0.22 | | |
| 9 | 30.4 | 1.52 | 1.52 | 10.65 | A1101, 0.19 | | |
| 10 | 29.4 | 0 | 1.47 | 10.29 | A1101, 0.22 | | 198 cPS |
| 11 | 400 | 16 | 20 | 140 | A1160, 0.4 | | 288–354 cPS |
| 12 | 400 | 16 | 20 | 140 | A1101, 0.22 | AOS*, 0.2 | 289–354 cPS |
| 13 | 400 | 16 | 20 | 140 | A1101, 0.22 | C61**, 0.2 | 288–354 cPS |
| 14 | 400 | 16 | 20 | 140 | A1101, 0.22 | | 289–354 cPs |

*AOS = Witconate AOS (Witco Inc.) olefin sulfonate ethanolated alkylguanidine amine complex.
**C61 = Aerosol C-61 surfactant produced by American Cyanamid (Ethenylated Amine Complex).

TABLE 9

| Sample No.* | Platen Temp °F. | Oven Temp °F. | % LOI | % Recovery |
|---|---|---|---|---|
| 1 | 475 | 450 | 5.6 | 74.4 |
| 3 | 475 | 450 | 5.8 | 70.8 |
| 4A | 475 | 450 | 4.8 | 73.5 |
| 4B | 475 | 450 | 3.5 | 75.5 |
| 4C | 475 | 450 | 5.2 | 66.4 |
| 5 | 475 | 450 | 3.0 | 74.1 |
| 8B | 475 | 450 | 4.3 | 71.4 |
| 8C | 475 | 450 | 5.0 | 78.0 |
| 9 | 475 | 450 | 5.6 | 76.3 |
| 10 | 475 | 450 | 7.2 | 72.9 |
| 11 | 475 | 450 | 9.6 | 76.1 |
| 12 | 475 | 450 | 7.5 | 74.9 |
| 13 | 475 | 450 | 7.9 | 75.4 |
| 14A | 550 | 475 | 8.8 | 75.5 |
| 14B | 500 | 450 | 8.6 | 75.2 |
| 14C | 475 | 425 | 7.8 | 74.3 |
| 14D | 450 | 400 | 8.1 | 73.5 |
| 14E | 450 | 375 | 8.6 | 74.5 |
| 14F | 450 | 350 | 8.6 | 72.3 |

*The sample numbers in Table 9 refer to the compositions of the same sample number given in Table 8. The suffix letters in the Table 9 sample numbers refer to different process conditions.

The above results indicate that the furan resin based binders of the instant invention produced fiber glass binder compositions that produce commercially acceptable recovery values.

While the best modes for carrying out the invention have been described in detail, those familiar with the art to which the invention relates will recognize various alternative designs and embodiments for practicing the invention as defined by the following claims.

What is claimed is:

1. A glass fiber binding composition suitable for preparing a binder-coated glass fiber random mat product having a binder solids content of from 1 weight percent to about 25 weight percent, prepared by spraying freshly formed glass fibers with said binding composition, said weight percent binder solids relative to the weight of said binder-coated glass fiber random mat product, said binder-coated glass fiber random mat product being compressible in thickness by a factor of from about 4 to about 12, the interstitial voids between glass fibers being substantially free of binder, said binding composition comprising:

an effective binding amount of an aqueous compatible furan resin;

15 to 99 percent by weight water, the total being 100% by weight, wherein said composition contains about 60 percent or more volatiles.

2. The glass fiber binding composition of claim 1 wherein the aqueous compatible furan resin comprises oligomers resulting from the polymerization reaction wherein at least one reagent is selected from the group consisting of the furan containing molecule having the general formula:

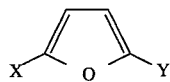

and its saturated analogs thereof having 0 to 1 carbon-carbon double bonds, wherein X and Y are independently comprised of organic molecular groups.

3. The glass fiber binding compositions of claim 2 wherein X and Y are independently comprised of molecular groups comprising one or more functional moieties selected from the group consisting of hydrogen, C1–C10 alkyl groups, polysubstituted vinyl radicals, polysubstituted aromatic groups, ketones, anhydrides, polysubstituted furfuryl, hydroxyls, aldehydes, carboxylic acids, esters, ethers, amines, imines, alkynes, alkyl halides, aromatic halides, olefinic halides, ethers, thiols, sulfides, nitriles, nitro groups, sulfones, sulfonic acids, and mixtures thereof.

4. The glass fiber binding composition of claim 3 wherein X and Y are comprised of terminal methylol (—CH$_2$OH) groups.

5. The glass fiber binding composition of claim 1 having a viscosity between 2 to 600 CPs at 25° C.

6. The glass fiber binding composition of claim 1 further comprising an effective amount of a catalyst for curing the furan resin.

7. The glass fiber binding composition of claim 6 comprising a catalyst selected from the group consisting of inorganic and organic acids and salts thereof, acid anhydrides, metal halides, and mixtures thereof.

8. The glass fiber binding composition of claim 6 comprising 1 to 20% catalyst.

9. The glass fiber binding composition of claim 1 further comprising a co-solvent.

10. The glass fiber binding composition of claim 9 wherein the co-solvent is selected from the group consisting of organic acids, and the salts and anhydrides thereof.

11. The glass fiber binding composition of claim 1 further comprising urea.

12. The glass fiber binding composition of claim 1 further comprising silane.

13. The glass fiber binding of claim 1 further comprising maleic acid and ammonium sulfate.

14. A process of binding glass fibers of a random glass fiber mat product at junctions of the fibers to form a binder-coated random glass fiber mat product, such that said binder-coated random glass fiber mat product contains from about 1 weight percent to about 25 weight percent binder solids based on the weight of said binder-coated random glass fiber mat product, comprising the steps of:

providing newly formed glass fibers;

applying an effective binding amount of an aqueous compatible furan resin-containing binder to the junctions of the glass fibers, said binder comprising from 15 to 99% by weight water and containing about 60% or more by weight volatiles; and curing said binder at the junctions of the glass fibers, said weight percents based on total binder weight wherein interstitial voids between said random glass fibers are substantially binder free.

15. The process of claim 14 wherein the aqueous compatible furan resin is comprised of oligomers resulting from the polymerization reaction wherein at least one reagent is selected from the group consisting of the furan containing molecule having the general formula:

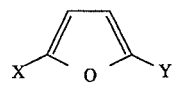

and its saturated analogs thereof having 0 to 1 carbon-carbon double bonds, wherein X and Y are independently comprised of organic molecular groups.

16. The process of claim 15 wherein X and Y are comprised of molecular groups comprising one or more functional moieties selected from the group consisting of hydrogen, C1–C10 alkyl groups, polysubstituted vinyl radicals, polysubstituted aromatic groups, ketones, anhydrides, polysubstituted furfuryl, hydroxyls, aldehydes, carboxylic acids, esters, ethers, amines, imines, alkynes, alkyl halides, aromatic halides, olefinic halides, ethers, thiols, sulfides, nitriles, nitro groups, sulfones, sulfonic acids, and mixtures thereof.

17. The process of claim 16 wherein X and Y are comprised of terminal methylol (—CH$_2$OH) groups.

18. The process of claim 14 wherein the aqueous compatible furan resin containing binder has a viscosity of 2 to 600 cPs at 25° C.

19. The process of claim 14 wherein the aqueous compatible furan resin containing binder further comprises a catalyst for curing the binder.

20. The process of claim 19 wherein the catalyst is selected from the group consisting of inorganic and organic acids and salts thereof, acid anhydrides, metal halides, and mixtures thereof.

21. The process of claim 19 wherein the aqueous compatible furan resin containing binder further comprises 1 to 20% by weight catalyst.

22. The process of claim 14 wherein the aqueous compatible furan resin containing binder further comprises a co-solvent.

23. The process of claim 14 wherein the aqueous compatible furan resin containing binder further comprises maleic acid and ammonium sulfate.

24. The process of claim 14 wherein the furan resin containing binder further comprises urea.

25. The process of claim 14 wherein the furan resin containing binder comprises silane.

26. The process of claim 14 wherein the effective binding amount of the aqueous compatible furan resin containing binder comprises from 1 to 25% L.O.I. as determined by the Loss On Ignition test.

27. The process of claim 14 wherein the step of curing the resin at the junctions of the glass fibers further comprises subjecting the glass fibers and applied binder to temperatures equal to or greater than 110° C. for at least 5 minutes.

28. A random glass fiber mat composition comprising:
a plurality of random glass fibers having a plurality of junctions where two or more fibers meet and;
an effective binding amount of an aqueous compatible furan resin-containing binder comprising 15 to 99% water, and containing 60 weight percent or more volatiles, applied to the junctions of the glass fibers to form a binder-coated random glass fiber mat composition containing from about 1 weight percent to about 25 weight percent binder solids based on the weight of said binder-coated random glass fiber mat composition, and being compressible in thickness by a factor of about 4 to about 12, interstitial voids between said glass fibers being substantially free of binder.

29. The glass fiber composition of claim 28 wherein the aqueous compatible furan resin containing binder has been cured.

30. The glass fiber composition of claim 28 wherein an effective binding amount of the aqueous compatible furan resin containing binder comprises an amount from 1 to 25% L.O.I.

31. The glass fiber composition of claim 28 wherein the aqueous compatible furan resin is comprised of oligomers resulting from the polymerization reaction wherein at least one reagent is selected from the group consisting of the furan containing molecule having the general formula:

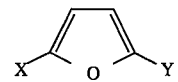

and its saturated analogs thereof having 0 to 1 carbon-carbon double bonds,
wherein X and Y are independently comprised of organic molecular groups.

32. The glass fiber composition of claim 31 wherein X and Y are comprised of molecular groups comprising one or more functional moieties selected from the group consisting of hydrogen, C1–C10 alkyl groups, polysubstituted vinyl radicals, polysubstituted aromatic groups, ketones, anhydrides, polysubstituted furfuryl, hydroxyls, aldehydes, carboxylic acids, esters, ethers, amines, imines, alkynes, alkyl halides, aromatic halides, olefinic halides, ethers, thiols, sulfides, nitriles, nitro groups, sulfones, sulfonic acids, and mixtures thereof.

33. The composition of claim 32 wherein the X and Y are comprised of terminal methylol (—CH$_2$OH) groups.

34. The composition of claim 28 wherein the furan containing binder is in the B-stage.

35. The composition of claim 28 wherein the furan resin is in the C-stage.

36. The glass fiber composition of claim 29 wherein the furan resin has been cured at temperatures greater than or equal to 110° C. for at least 5 minutes.

* * * * *